US009058840B2

United States Patent
Seo

(10) Patent No.: US 9,058,840 B2
(45) Date of Patent: Jun. 16, 2015

(54) METHOD OF DISPLAYING MOVING IMAGE AND IMAGE PLAYBACK APPARATUS TO DISPLAY THE SAME

(75) Inventor: Jin-hwan Seo, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1559 days.

(21) Appl. No.: 11/856,236

(22) Filed: Sep. 17, 2007

(65) Prior Publication Data

US 2008/0267576 A1 Oct. 30, 2008

(30) Foreign Application Priority Data

Apr. 27, 2007 (KR) .................. 10-2007-0041315

(51) Int. Cl.
*H04N 9/80* (2006.01)
*G11B 27/00* (2006.01)
*G11B 27/10* (2006.01)
*G11B 27/28* (2006.01)
*G11B 27/34* (2006.01)

(52) U.S. Cl.
CPC ............ *G11B 27/007* (2013.01); *G11B 27/105* (2013.01); *G11B 27/28* (2013.01); *G11B 27/34* (2013.01); *G11B 2220/20* (2013.01); *G11B 2220/2537* (2013.01)

(58) Field of Classification Search
CPC .. G11B 27/105; G11B 27/329; G11B 27/034; H04N 5/85; H04N 9/8042
See application file for complete search history.

(56) References Cited

U.S. PATENT DOCUMENTS

| 6,965,701 | B2 | 11/2005 | Tojo |
| 7,356,244 | B2* | 4/2008 | Yu .................................. 386/241 |
| 7,929,823 | B2* | 4/2011 | Roh .............................. 386/241 |
| 2003/0177493 | A1 | 9/2003 | Hirose |
| 2004/0268223 | A1 | 12/2004 | Tojo |
| 2007/0237225 | A1* | 10/2007 | Luo et al. ................. 375/240.12 |

FOREIGN PATENT DOCUMENTS

| CN | 1361630 | 7/2002 |
| CN | 1610904 | 4/2005 |
| EP | 1 107 613 | 6/2001 |
| EP | 1 544 861 | 6/2005 |

(Continued)

OTHER PUBLICATIONS

European Search Report dated Aug. 7, 2008 issued in EP 08151364.0.

(Continued)

*Primary Examiner* — William C Vaughn, Jr.
*Assistant Examiner* — Daniel Tekle
(74) *Attorney, Agent, or Firm* — Staas & Halsey LLP

(57) ABSTRACT

A method of displaying a moving image and an image playback apparatus to display the same. According to the method, the image playback apparatus reduces each first I frame of one or more moving images stored in a recording medium and displays thumbnail images. The image playback apparatus also displays a thumbnail moving image generated based on thumbnail images which correspond to I frames extracted at regular intervals from a selected moving image. If a playback command is input while the thumbnail moving image is being displayed, the image playback apparatus can display the selected moving image from a scene corresponding to a thumbnail image obtained from a point at which the playback command is input.

10 Claims, 3 Drawing Sheets

(56) References Cited

FOREIGN PATENT DOCUMENTS

| | | |
|---|---|---|
| JP | 11-146326 | 5/1999 |
| KR | 2003/0056546 | 7/2003 |
| KR | 2004-44373 | 5/2004 |
| KR | 2005-76132 | 7/2005 |
| KR | 1020060068985 | 6/2006 |
| WO | WO 2007/133668 | 11/2007 |
| WO | WO 2008/018670 | 2/2008 |

OTHER PUBLICATIONS

Chinese Office Action issued Feb. 17, 2011 in CN Application No. 200810005736.2.

European Examination Report Issued on Feb. 14, 2012 in EP Patent Application No. 08151364.0.

Chinese Office Action dated May 31, 2013 issued in CN Application No. 200810005736.2.

\* cited by examiner

METHOD OF DISPLAYING MOVING IMAGE AND IMAGE PLAYBACK APPARATUS TO DISPLAY THE SAME

CROSS-REFERENCE TO RELATED APPLICATIONS

This application claims priority under 35 U.S.C. §119 (a) of Korean Patent Application No. 10-2007-0041315, filed on Apr. 27, 2007, in the Korean Intellectual Property Office, the disclosure of which is incorporated herein by reference in its entirety.

BACKGROUND OF THE INVENTION

1. Field of the Invention

The present general inventive concept relates to a method of displaying a moving image and an image playback apparatus to display the same. More particularly, the present general inventive concept relates to a method of displaying a moving image and an image playback apparatus to display the same, in which a user can quickly recognize the content of a moving image recorded in a recording medium.

2. Description of the Related Art

Generally, moving image data is recorded in recording media such as compact discs (CDs) and digital video discs (DVDs). Coding compression algorithms, introduced by the Moving Picture Experts Group (MPEG), are typically applied to the recording media to compress and encode the moving image data in order to form small bits of data that can easily be transmitted and then decompressed.

An image playback apparatus reads the encoded moving image data from the recording medium, decodes the encoded moving image data into original data, and plays back a moving image recorded in the recording medium.

FIG. 1 is a view illustrating the arrangement of frames stored in a moving image recording medium. In FIG. 1, moving images stored in the recording medium comprise I, B and P frames. Each frame is arranged in the order of I→B→B→P→B→B→P→B→B.

An I frame is a frame that is coded using only independent still images without the prediction of previous and subsequent frames, a B frame is formed by calculating a difference between previous and subsequent frames, and a P frame is formed by detecting motion of a previous image and a current image and predicting motion compensation.

A moving image has a set of successive still images, so if each still image is compressed and if each of the compressed images are transmitted, the size of the moving image may be much larger. Accordingly, the moving image may be compressed in the order of I, B and P frames as described above and the compressed image may be transmitted, as illustrated in FIG. 1.

When a conventional image playback apparatus enters a playback mode or a search mode is selected, a thumbnail image is displayed by reducing the size of the first I frame for a single moving image. Specifically, the conventional image playback apparatus extracts the first I frame from the moving image stored in the recording medium, generates a thumbnail image from the first I frame, and displays the thumbnail image.

However, it is difficult to check the whole content of a moving image using only a single thumbnail image. For instance, in order to find a desired moving image, a user may need to play back all the moving images stored in the recording medium from the beginning, which is inconvenient to the user.

Additionally, when the desired moving image is selected, there is a need to play back the selected moving image from the beginning in order to find a desired scene in the selected moving image.

SUMMARY OF THE INVENTION

The present general inventive concept provides a method of displaying a moving image and an image playback apparatus to display the same, in which a thumbnail moving image generated from respective thumbnail images of a selected moving image, can be displayed in order for a user to easily check the outline of the whole moving image.

The present general inventive concept also provides a method of displaying a moving image and an image playback apparatus to display the same, in which a moving image can be played back from a scene corresponding to a thumbnail image from a point in which a playback command is input if the playback command is input while a thumbnail moving image is being displayed.

Additional aspects and utilities of the present general inventive concept will be set forth in part in the description which follows and, in part, will be obvious from the description or may be learned by practice of the general inventive concept.

The foregoing and/or other aspects and utilities of the present general inventive concept may be achieved by providing a method of displaying a moving image, the method including extracting predetermined frames from a plurality of stored moving images at regular intervals, generating thumbnail images that correspond to the extracted frames, and displaying the generated thumbnail images. If one thumbnail image is selected from among the displayed thumbnail images, the thumbnail images is displayed as a moving image thumbnail image corresponding to the predetermined frames contained in a moving image corresponding to the selected thumbnail image.

The method may further include playing back a moving image from a scene corresponding to a thumbnail image obtained from a point at which a playback command is input, if the playback command is input while the thumbnail images are being displayed as a moving image.

The predetermined frames may be I frames. The regular intervals may be preset when the image playback apparatus is manufactured, or set through a user interface, so that the content of the moving image can continue to be played back.

The method of displaying the thumbnail images may further include displaying thumbnail images corresponding to each first I frame extracted from the plurality of moving images.

The method of displaying the thumbnail images may also include continuously outputting and displaying thumbnail images corresponding to I frames extracted at regular intervals from the moving image corresponding to the selected thumbnail image.

The foregoing and/or other aspects and utilities of the present general inventive concept may be achieved by providing an image playback apparatus including a frame extractor to extract predetermined frames from a plurality of stored moving images at regular intervals, and a thumbnail image generator to generate thumbnail images corresponding to the extracted frames, and to display the thumbnail images as a moving image thumbnail image corresponding to predetermined frames contained in the stored moving image corresponding to a selected thumbnail image, if one image is selected from among the displayed thumbnail images.

The image playback apparatus may further include a playback unit to play back a moving image from a scene corresponding to a thumbnail image obtained from a point at which a playback command is input, if the playback command is input while the thumbnail images are being displayed as a moving image thumbnail image.

The predetermined frames may be I frames. The regular intervals may either be preset when the image playback apparatus is manufactured, or set through a user interface, so that content of the moving image can continue to be played back.

The thumbnail image generator may display thumbnail images corresponding to each first I frame of the plurality of moving images.

The thumbnail image generator may continuously output and display thumbnail images corresponding to I frames which are extracted at regular intervals from the moving image corresponding to the selected thumbnail image.

The foregoing and/or other aspects and utilities of the present general inventive concept may also be achieved by providing a method of generating a moving image thumbnail image having thumbnail images corresponding to predefined frames extracted from a plurality of images.

The method may also include displaying the moving image thumbnail image to display the thumbnail images.

The method may further include selecting one of the thumbnail images and displaying one of the moving images corresponding to the selected one.

The predefined frames of the plurality of frames of the plurality of moving images may have an interval therebetween.

The interval may be determined according to a user command.

The method of selecting one of the thumbnail images may further include displaying a scene starting with the frame corresponding to the selected thumbnail image.

The predefined frames may be I frames.

The method may further include determining if a search command is input into the image playback apparatus and displaying the thumbnail image corresponding to a first extracted I frame of the stored thumbnail images.

The foregoing and/or other aspects and utilities of the present general inventive concept may also be achieved by providing a moving image playback apparatus including an image processor to generate a moving image thumbnail image having thumbnail images corresponding to predefined frames extracted from a plurality of moving images.

BRIEF DESCRIPTION OF THE DRAWINGS

These and/or other aspects and utilities of the present general inventive concept will become apparent and more readily appreciated from the following description of the embodiments, taken in conjunction with the accompanying drawings of where.

DETAILED DESCRIPTION OF THE PREFERRED EMBODIMENTS

Figure 1:
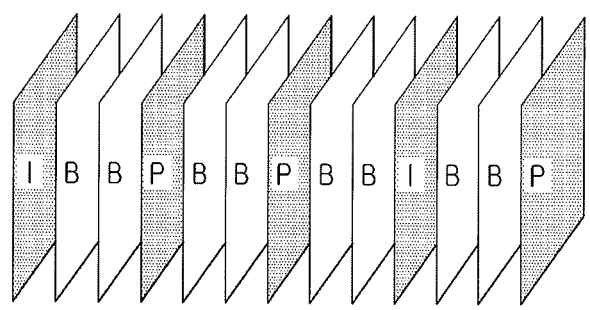
FIG. 1 is a view illustrating the arrangement of frames stored in a moving image recording medium.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
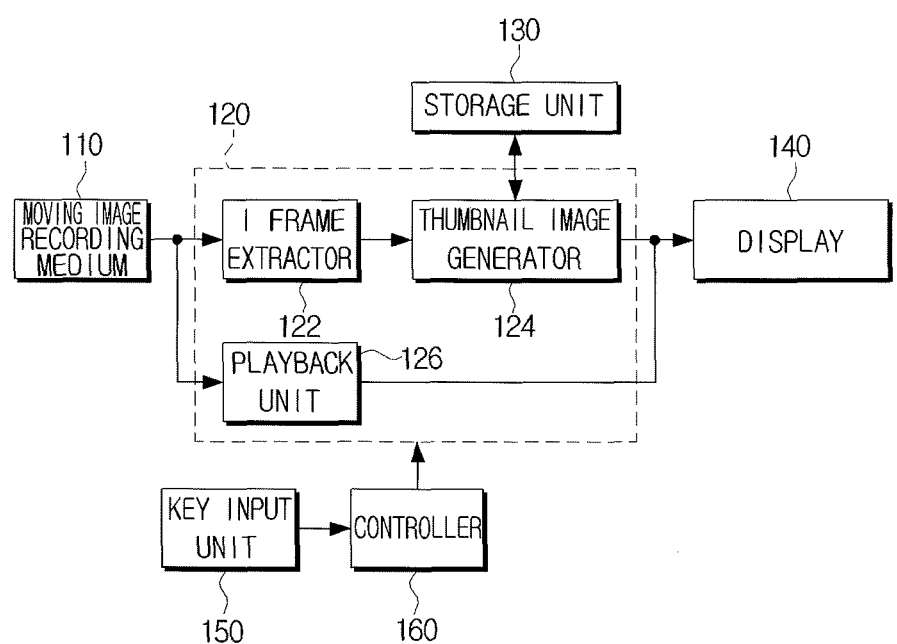
FIG. 2 is a block diagram illustrating an image playback apparatus according to an embodiment of the present general inventive concept.

FIG. 2 is a block diagram illustrating an image playback apparatus according to an embodiment of the present general inventive concept.

The image playback apparatus can reduce first I frames of one or more moving images stored in a recording medium, and can display the reduced images as thumbnail images. Additionally, the image playback apparatus can display a thumbnail moving image which is generated from the thumbnail images corresponding to I frames extracted from a selected stored moving image at regular intervals. In the thumbnail moving image, the thumbnail images can be simultaneously or serially displayed. It is also possible that the thumbnail images can be individually displayed according to corresponding input commands. Here, each moving image may include a plurality of I frames, B frames, and P frames and the recording medium may store a plurality of moving images in a predetermined title.

If a playback command is input while the thumbnail moving image is being displayed, the image playback apparatus can display a scene from the selected moving image corresponding to a thumbnail image obtained from a point at which the playback command is inputted.

Referring to FIG. 2, the image playback apparatus includes a moving image recording medium 110, an image processor 120, a storage unit 130, a display 140, a key input unit 150, and a controller 160.

The image processor 120 can process signals so that the moving image stored in the moving image recording medium 110 can be displayed. The image processor 120 includes an I frame extractor 122, a thumbnail image generator 124 and a playback unit 126.

Specifically, the I frame extractor 122 can extract I frames at regular intervals from the moving image stored in the moving image recording medium 110. The thumbnail image generator 124 can generate thumbnail images corresponding to the extracted I frames and store the generated thumbnail images in the storage unit 130.

If a command to enter a playback mode or a command to select a search mode is input into the image playback apparatus, the thumbnail image generator 124 displays a thumbnail image corresponding to the first extracted I frame of the moving image stored in the moving image recording medium 110 on the display 140. If a plurality of moving images are recorded in the moving image recording medium 110, a plurality of thumbnail images corresponding to the respective first I frames of each of the plurality of moving images can be displayed. Hereinafter, description will be given for the case in which the plurality of moving images are stored in the moving image recording medium 110.

If a command to select one of the plurality of displayed thumbnail images is input, the thumbnail image generator 124 may continuously display on the display 140 the displayed thumbnail images for I frames of the moving images corresponding to the selected thumbnail image. In other words, selection of one of the plurality of displayed thumbnail images represents that a single moving image has been selected. The thumbnail image generator 124 can sequentially output the thumbnail images for the extracted I frames of the selected moving image from the storage unit 130, and can display the thumbnail images as a thumbnail moving image.

The playback unit 126 can play back the moving image stored in the moving image recording medium 110, that is, the playback unit 126 can process signals so that the moving image can be displayed on the display 140.

The key input unit 150 includes a key to input the command to enter the playback mode, a key to select the search mode, a key to select one of the plurality of displayed thumbnail images, a key to input a playback command, as well as various other keys. The image playback apparatus can enter the playback mode automatically at the same time that the moving image recording medium 110 is mounted, without using the key to input the command to enter the playback mode.

The controller 160 can control the image processor 120 so that the image playback apparatus can enter the playback mode when the moving image recording medium 110 is mounted. If a command to enter the playback mode or a command to select the search mode is input through the key input unit 150, the controller 160 can either control the image processor 120 to enter the playback mode or control the image processor to launch the search mode.

The controller 160 can control the I frame extractor 122 and the thumbnail image generator 124 to extract the I frames from the moving images stored in the moving image recording medium 110 at regular intervals for a duration of time (i.e. number of occurrences with a given timeframe) to generate thumbnail images corresponding to the extracted I frames, store the generated thumbnail images in the storage unit 130, and display on the display 140 the thumbnail images for the first I frames from among the stored thumbnail images.

If the command to select one of the plurality of displayed thumbnail images is input through the key input unit 150, the controller 160 can control the thumbnail image generator 124 to display the thumbnail images for the respective I frames of the moving images corresponding to the selected thumbnail image, as a thumbnail moving image.

Additionally, if the playback command is inputted through the key input unit 150 while displaying the thumbnail moving image, the controller 160 can control the playback unit 126 to display a moving image stored in the moving image recording medium, selected from a scene corresponding to a thumbnail image obtained from a point at which the playback command is input.

Figure 3:
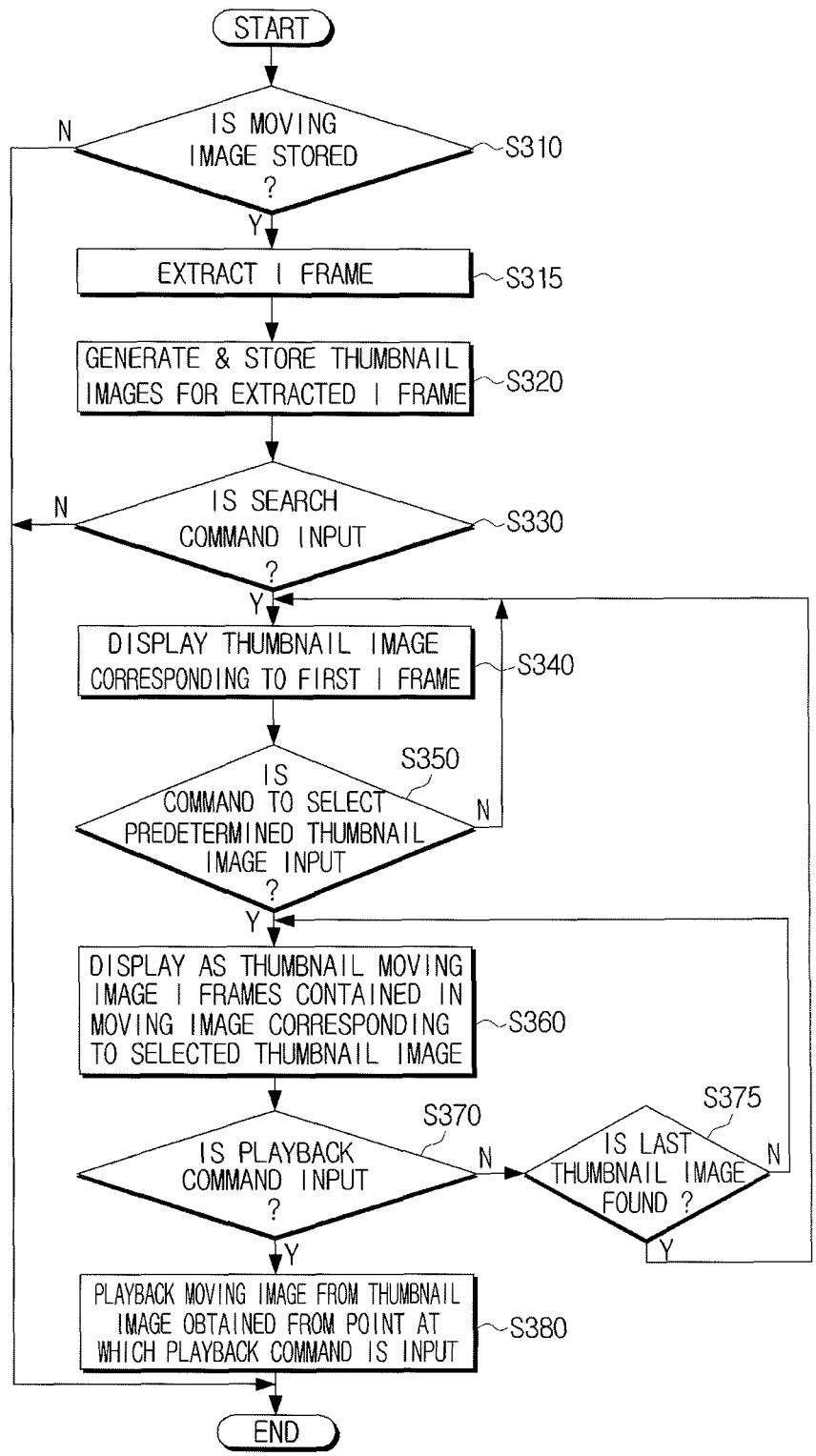
FIG. 3 is a flowchart illustrating a method of displaying a moving image in an image playback apparatus according to an embodiment of the present general inventive concept.

FIG. 3 is a flowchart illustrating a method of displaying a moving image in an image playback apparatus according to an embodiment of the present general inventive concept.

In FIG. 3, the controller 160 can determine whether a moving image is stored in the mounted moving image recording medium 110 in operation S310.

If the controller 160 determines that a moving image is stored, the controller 160 can control the I frame extractor 122 to extract the I frames at regular intervals from the stored moving image in operation S315. The I frame extractor 122 can extract I frames from the stored moving image at preset regular intervals, rather than all I frames of the moving image. The interval to extract I frames can be preset when the image playback apparatus is manufactured, so that content of the moving image can continue to be played back. Alternatively, a user can set the interval to extract I frames to be two, four or any desired multiple thereof.

The controller 160 can control the thumbnail image generator 124 to generate thumbnail images corresponding to the extracted I frames and control the thumbnail image generator to store the generated thumbnail images in the storage unit 130. For example, if a captured moving image has a duration of approximately 10 minutes and I frames of the moving image are extracted every 5 seconds, the thumbnail image generator 124 can generate one hundred and twenty thumbnail images, which correspond to the extracted number of I frames (one hundred and twenty frames is obtained by dividing 60 seconds by 5 seconds and multiplying that quotient by 10 minutes, which represented numerically is (60/5)*10)), and can store the generated thumbnail images in the storage unit 130.

The controller 160 can also determine whether the search command is inputted in operation S330. If it is determined that the search command is inputted, the controller 160 can control the thumbnail image generator 124 to display on the display 140 a thumbnail image corresponding to the first I frame from among the stored thumbnail images in operation S340.

As described above, if it is determined that the moving image is stored in the moving image recording medium 110, the I frames can be extracted from the pre-stored moving image, and thumbnail images can be generated and stored. In the above scenario, the thumbnail images can be displayed only when the search command is input, but the present general inventive concept is not limited thereto.

In operation S310, if the controller 160 determines that the moving image recording medium 110 is mounted, or that the search command has been inputted, it is possible to extract the I frames from the stored moving image, and to generate, store and directly display the thumbnail images.

The controller 160 can determine whether a command to select a predetermined thumbnail image from among the displayed thumbnail images is input in operation S350.

If it is determined that the command to select a predetermined thumbnail image ha been input, the controller 160 can control the thumbnail image generator 124 to display the I frames contained in the moving image corresponding to the selected thumbnail image, as a thumbnail moving image in operation S360. For example, the thumbnail image generator 124 can generate one hundred and twenty thumbnail images by extracting I frames of a captured moving image with a duration of approximately 10 minutes every 5 seconds, and can continuously output the thumbnail images every 0.25 seconds, so that a thumbnail moving image lasting 30 seconds can be displayed (thirty seconds being obtained by multiplying the 120 images by 0.25 seconds which represented numerically is 120*0.25).

As described above, the moving image with a duration of approximately 10 minutes can be displayed as a thumbnail moving image for 30 seconds, so a user can recognize the outline of the moving image. Additionally, if the I frames are extracted every 10 seconds, a thumbnail moving image lasting 15 seconds can be displayed, and accordingly the size of the moving image can be greatly reduced. Therefore, the moving image can have a smaller capacity, so less load can be imposed on a system.

The controller 160 can determine whether the playback command is input while the thumbnail moving image is being displayed in operation S370. If it is determined that the playback command has not been input, the controller 160 can determine whether a last thumbnail image is found in operation S375.

If it is determined that a last thumbnail image is found, that is, if it is determined that the display of the thumbnail moving image is completed, the controller 160 can permit the thumbnail image generator 124 to display on the display 140 the thumbnail image corresponding to the first I frame at operation S340.

On the other hand, if it is determined that a last thumbnail image is not found, that is, if it is determined that the display of the thumbnail moving image is not completed, the controller 160 can permit the thumbnail image generator 124 to continue displaying the thumbnail moving image at operation S360.

If it is determined that the playback command is input in operation S370, the controller 160 can control the playback unit 126 to play back the moving image from the thumbnail image obtained from a point at which the playback command is input in operation S380.

Although not illustrated in the drawings, if a cancel command is input while the thumbnail moving image is being displayed, the controller 160 can again proceed from operation S340. Additionally, if a predetermined thumbnail image is selected from among the displayed thumbnail images and the playback command is input immediately, the controller 160 can allow a moving image for the selected predetermined thumbnail image to be played back, instead of displaying the thumbnail moving image.

Various embodiments of the present general inventive concept can be embodied as computer readable codes on a computer-readable medium. The computer-readable medium includes a computer-readable recording medium and a computer-readable transmission medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable transmission medium can be distributed over network coupled computer systems, through wireless or wired communications over the internet, so that the computer readable code is stored and executed in a distributed fashion. Various embodiments of the present general inventive concept may also be embodied in hardware or in a combination of hardware and software.

Although the plurality of moving images are stored in the recording medium as described above, it is possible to apply the present general inventive concept to a situation in which a single moving image is stored, through the same process described above. However, if a thumbnail image corresponding to the first I frame of the moving image is displayed and then selected, the thumbnail images contained in the moving image can be displayed as a thumbnail moving image.

As described above, the present general inventive concept enables a user to recognize the outline of the stored moving image within a short period of time, and it is possible to play back the moving image from a desired scene, thereby increasing user convenience. In addition, it is possible to reduce a plurality of I frames for viewing an undesired moving image.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of displaying a moving image, the method comprising:
    extracting I frames according to a predetermined interval from a stored moving image which includes a plurality of I frames, B frames, and P frames;
    generating thumbnail images corresponding to the extracted I frames;
    displaying one thumbnail image among the thumbnail images;
    in response to the displayed thumbnail image being selected, displaying thumbnail images, as a moving image, corresponding to the extracted I frames from the moving image corresponding to the selected thumbnail image; and
    playing back the moving image from a scene corresponding to a thumbnail image obtained from a point at which a playback command is input, in response to the playback command being input while the thumbnail images are being displayed as a moving image,
    wherein the extracting the I frames according to the predetermined interval comprises extracting a first I frame in the stored moving image, and extracting every N I frames after the first I frame among the I frames in the stored moving image, where N is greater than 1 and is less than a total number of I frames in the stored moving image.

2. The method of claim 1, wherein the stored moving image includes a plurality of moving images, and the generating thumbnail images corresponding to the extracted I frames is executed for each of the plurality of moving images.

3. The method as claimed in claim 1, wherein:
    the predetermined interval is preset when an image playback apparatus is manufactured, or set through a user interface, so that content of the moving image continues to be played back.

4. An image playback apparatus comprising:
    a frame extractor to extract I frames according to a predetermined interval from a stored moving image which includes a plurality of I frames, B frames, and P frames;
    a thumbnail image generator to generate thumbnail images corresponding to the extracted I frames, and to display one thumbnail image among the thumbnail images,
    wherein, in response to the displayed thumbnail image being selected, the thumbnail image generator displays thumbnail images, as a moving image, corresponding to the extracted I frames from the moving image corresponding to the selected thumbnail image; and
    a playback unit to play back the moving image from a scene corresponding to a thumbnail image obtained from a point at which a playback command is input, in response to the playback command being input while the thumbnail images are being displayed as a moving image,
    wherein the frame extractor extracts the I frames according to the predetermined interval by extracting a first I frame in the stored moving image, and extracting every N I frames after the first I frame among the I frames in the stored moving image, where N is greater than 1 and is less than a total number of I frames in the stored moving image.

5. The apparatus as claimed in claim 4, wherein
    the predetermined interval is preset when the apparatus is manufactured, or set through a user interface, so that content of the moving image continues to be played back.

6. A method of displaying a moving thumbnail image in a moving image playback apparatus, the method comprising:
    generating a thumbnail moving image having thumbnail images corresponding to I frames extracted from a moving image which is stored in a moving image recording medium, the moving image including a plurality of I frames, B frames, and P frames;
    determining whether a playback command is input during the displaying of the thumbnail moving image; and
    playing back a moving image selected from a scene using a thumbnail image obtained at a point from when the playback command is input, the moving image corresponding to the I frames extracted from the moving image from the scene of the selected thumbnail image, the playing back including continuously outputting and displaying thumbnail images of the moving image corresponding to the extracted I frames from the moving image corresponding to the selected scene within the thumbnail image at the point when the playback command is input, wherein the I frames are extracted according to a predetermined interval by extracting a first I frame in the stored moving image, and extracting every N I frames after the first I frame among the I frames in the stored moving image, where N is greater than 1 and is less than a total number of I frames in the stored moving image.

7. The method of claim 6, wherein the predetermined interval is determined according to a user command.

8. The method of claim 6, wherein selecting one of the thumbnail images further comprises displaying a scene starting with the frame corresponding to the selected thumbnail image.

9. The method of claim 6 further comprising:
   determining if a search command is input into the image playback apparatus; and
   displaying the thumbnail image corresponding to a first extracted I frame of the stored thumbnail images.

10. A moving image playback apparatus comprising:
    an image processor to generate a thumbnail moving image having thumbnail images corresponding to I frames extracted from a stored moving image which is stored in a moving image recording medium, the stored moving image including a plurality of I frames, B frames, and P frames;
    a display communicatively coupled to the image processor to display the generated thumbnail moving image; and
    a playback unit to play back a moving image on the display from a scene corresponding to a thumbnail image obtained from a point at which a playback command is input, in response to the playback command being input while the thumbnail images are being displayed as the thumbnail moving image, the moving image corresponding to the I frames extracted from the moving image from the scene where the playback command is input, the playback unit to continuously output and display thumbnail images of the moving image corresponding to the extracted I frames from the moving image corresponding to the selected scene within the thumbnail image at the point when the playback command is input,
    wherein the I frames are extracted according to a predetermined interval by extracting a first I frame in the stored moving image, and extracting every N I frames after the first I frame among the I frames in the stored moving image, where N is greater than 1 and is less than a total number of I frames in the stored moving image.

* * * * *